July 7, 1970        E. C. DENCH        3,519,517

METHOD OF AND MEANS FOR MICROWAVE HEATING OF ORGANIC MATERIALS

Filed Sept. 30, 1966        2 Sheets-Sheet 1

INVENTOR
EDWARD C. DENCH
BY *Edgar C. Kost*
ATTORNEY

July 7, 1970 E. C. DENCH 3,519,517

METHOD OF AND MEANS FOR MICROWAVE HEATING OF ORGANIC MATERIALS

Filed Sept. 30, 1966 2 Sheets-Sheet 2

INVENTOR
EDWARD C. DENCH
BY
ATTORNEY

3,519,517
METHOD OF AND MEANS FOR MICROWAVE HEATING OF ORGANIC MATERIALS

Edward C. Dench, Annisquam, Mass., assignor to Raytheon Company, Lexington, Mass., a corporation of Delaware
Filed Sept. 30, 1966, Ser. No. 583,330
Int. Cl. B29c *19/02;* B29h *5/26;* H05b *9/06*
U.S. Cl. 156—380                                          4 Claims

ABSTRACT OF THE DISCLOSURE

A product having a high granular content is adhesively bonded together utilizing microwave energy radiated within an enclosure. The addition of a material having high microwave energy absorbing characteristics, such as graphite, carbon, carbon black or a powdered refractory metal, permits substantial reduction in curing times of, illustratively, sand core molds in the foundry industry to yield a self-supporting product. The improvement is also applicable to other products where adhesive bonding is required.

---

The invention relates generally to heating by high frequency alternating fields materials which are not readily heated by other thermal means such as direct heat and more particularly to selective heating by microwave energy means of materials having an adhesive material dispersed therein to cure or bond by thermal action the molecules within the material.

Dielectric heating has found wide acceptance in industry for treatment of inherently poor thermal conductors. In particular, such materials as paper, wood, leather, as well as refractory materials including sand, may be processed by bringing the material up to temperature in a high frequency alternating electric field established within an enclosure or along the path of a conveyorized assembly line. Generally a nonhomogeneous load is thereby presented to the oscillating electric field. The time-temperature dependence of the product to be processed therefore becomes a function of the varied dielectric constants of the load as well as the power factor. This latter parameter represents the amount of current which will flow through the mass and produce a heat loss. It is common practice in the dielectric heating art to multiply the dielectric constant and power factor to obtain a measure of the total loss, sometimes referred to as the loss factor, which may be expressed as $E^1/E_0$ tangent $\delta$ (loss angle). The total energy required then to heat a specific dielectric load may be expressed by the equation:

$$W = AfE^2[E^1/E_0 \tan \delta] \times 10^{-12}$$

where:

W is the energy density; A is a constant having a value of 1.41; $f$ is the frequency of the field in cycles per second; and E is the alternating electric field in the material. In this equation the area and thickness dimensions have been purposely omitted since the invention will deal with general material considerations. It is evident therefore that investigation of the physical characteristics of the materials from the standpoint of both homogeneity as well as loss factor is a primary consideration in dielectric heating applications.

Due to the nonuniformity of the selected materials it is difficult to obtain uniform bonding of the dielectric mass without the addition of certain adhesive binders together with other known materials having desirable high dielectric constants to accelerate the molecular deformation through thermal energy of the product being processed. In addition, it is desirable in certain processes for externally applied adhesives to be rapidly heated to bond non-conductive materials. In particular, metalworking foundries have adopted the use of such adhesive binders as thermosetting resins in the baking by dielectric heating of refractory cores for casting and molding operations. As is well known, such cores are required to fill cavities which are retained in the final product. During the pouring of the molten metal such cores must withstand exceedingly high temperatures as well as the pressures and strains of the molten mass. In the core mix formulations certain thermosetting resins found to have wide application in the wood gluing field have been adopted as core binders to retain the many complex shapes required of such cores. Such resins as phenol-formaldehyde and urea-formaldehyde which decompose at temperatures of around 600° F. also permit removal of the dielectric core material after the casting has been fabricated without any undesirable by-products such as a sticky or carmelized paste or ash. In addition to the formation of dielectric cores in the metal foundry industry, thermosetting resins have wide application in the collating and gluing of business forms where a plurality of sheets of paper are united by means of externally applied hot-melted adhesive material. Referring again to the aforementioned equation, the factors $f$ and $E$ or the frequency and electric field in the material are of chief concern in the adoption of dielectric heating apparatus. Commonly, such apparatus comprises opposing electrodes or condenser plates having the electric alternating field disposed therebetween with the materials to be heated, baked or thermally bonded disposed between the electrodes. The limitations of the art in the high frequency generators plus cost and availability of power sources, as well as time considerations, have resulted in the operation of prior art dielectric heating apparatus at frequencies in the order of 1 to 30 megacycles per second. With the advent of radar in the war years a new source of oscillating energy evolved employing microwaves with an availability of much higher frequencies and millions of watts of energy available. Such high frequency sources as magnetrons as well as klystrons therefore offer an attractive inducement in the dielectric heating field as a means for rapidly speeding up the processing cycles in thermally treating materials.

For the purpose of this specification the term "microwave" is defined as very short electromagnetic waves having wavelengths in the order of 60 centimeters or less and frequencies in excess of 300 megacycles per second.

Accordingly, it is a primary object of the present invention to provide a means for the application of microwave energy sources in the dielectric heating of poor thermally conductive materials.

Another object of the present invention is the provision of a means for the application of microwave energy in the dielectric heating of adhesive materials.

Still another object of the present invention is the provision of a means for the application of microwave energy in dielectric heating of materials having resinous adhesive binders to cure and bake such materials more efficiently than prior art methods and apparatus.

Further objects, advantages and features of the present invention will be evident after consideration of the following detailed description together with the accompanying drawings in which.

Figure 1:
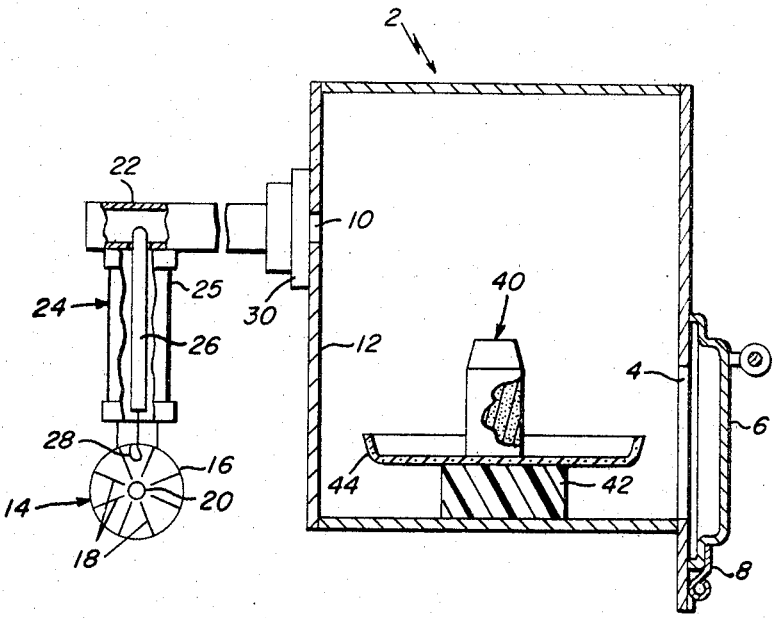
FIG. 1 is a vertical cross-section of an illustrative microwave heating apparatus.

Referring now to the drawings and in particular to FIG. 1, a microwave oven 2 is illustrated as a hollow thin-walled metallic enclosure preferably having the shape of a rectangular parallelopiped. Access to the interior of the oven is achieved by means of a rectangular aperture 4, illustratively near the lower end of the front wall, enclosed by a door 6 which may be hinged as indicated by numeral 8. It will be observed that with the door in its closed position a complete enclosure is provided which may be radiated with radio frequency energy in the microwave region through aperture 10 in the back wall 12 of the oven.

The suggested source of high frequency energy is the well known electron discharge device of the magnetron type 14. Illustratively, an evacuated envelope 16 of a highly conductive metal, such as copper, is provided with a plurality of radially disposed anode vanes 18 circumferentially disposed around a central electron-emissive cathode 20. Such cathode member may be of the well known alkaline-earth metal oxide type and is provided with conventional means (not shown) for raising the temperature thereof to a level sufficient for thermionic emission.

Magnetron 14 is completed by magnetic means (not shown) for producing a magnetic field transverse to the electron path and is energized from any suitable source, not illustrated for the sake of clarity in an understanding of the present invention. When so energized high frequency electromagnetic wave energy is directed to a hollow waveguide 22 by mean of a coaxial transmission line 24 having a central conductor 26 coupled to the mag-into the interior of waveguide 22 to serve as an exciting rod or probe for said guide. The outer conductor 25 of coaxial line 24 is connected at one end to the envelope 16 with the opposite end connected to a wall of waveguide 22.

The interior of waveguide 22 is placed in energy exchanging relationship with the interior of the oven 2 by means of the aperture 10 having substantially the size and dimensions as the interior of the waveguide 22. By means of the magnetron and waveguide transmission structure the microwave energy is fed to the interior of the oven. The waveguide 22 is secured to the wall 12 of the oven by suitable fastening means 30.

A product indicated generally by the reference numeral 40 is illustratively shown as a foundry core disposed within the oven 2 for heating by the microwave energy. Preferably the product is positioned within the oven enclosure by means of a dielectric block 42 for more efficient application of the microwave agency for baking the foundry core. Additionally, a plate or dish 44 may be provided to catch any spillage of the granular product comprising the parent material of the foundry core 40. The heating effect of the high frequency microwave energy is increased by the addition of the block 42 since the foundry core 40 is spaced from the metallic oven wall. The block 42 is preferably made of a material having a low radio frequency loss so as not to be heated appreciably when the oven is on. Similarly, the dish 44 is desirably of a low loss dielectric material.

The composition of the illustrative product and the means for increasing the efficiency of dielectric heating by means of microwave energy will now be described. In the fabrication of foundry cores fine granular materials such as sand capable of withstanding exceedingly high temperatures of molten metals have now been widely adopted. The granular particles must be bonded together in a wide variety of shapes and sizes which must be maintained to very close tolerances throughout the casting operation. One of the additives which has evolved in foundry practice is a resinous thermosetting adhesive material together with catalysts and accelerators to assist in the polymerization of the adhesive. In the prior art such foundry cores have been baked in conventional or dielectric heating apparatus without being able to take advantage of the fast heating times available with microwave energy due to the varying dielectric loss factors of the materials used. An exemplary mix formulation with the percentages shown being by weight, might be as follows:

|  | Percent |
|---|---|
| Cereal flour | 1 |
| Binder (urea or phenol base) | 0.5 |
| Molasses | 0.5 |
| Catalyst | 0.1 |
| Water | 1.5 |
| Boric acid | 0.25 |
| Sand (Jersey silica—70 mesh) | Balance |

After the liquids and solids are mixed the mixture is mulled. The cores are shaped in the molds and are either hand-rammed or blown in the core boxes to compress the mix. Such foundry cores when baking was attempted in conventional microwave oven apparatus were found to exhibit a low attenuation of between .0495 and 0.156 decibels per centimeter of the material. It was therefore evident that curing of such cores by the utilization of microwave energy would not measurably decrease the processing time over conventional heating techniques at considerably lower frequencies and electric fields.

In accordance with the teachings of the invention an additive of a high radio frequency energy absorbing material having a high specific resistance is incorporated in the mix formulation. Such materials are sometimes referred to in the art as "anechoic" since they are utilized as microwave energy absorbers where attenuation of such energy is desired in transmission systems. Graphite, carbon and carbon black are representative of this group of materials and are desirably employed in powdered form to assure thorough dispersion in the sand core mix formulation under consideration. Other high lossy materials may be suggested for other applications and in particular powdered refractory metals such as molybdenum, tungsten, etc., may also be employed.

In conjunction with the foregoing core formulation I have discovered that the addition of the foregoing material in a fractional part of the total over-all weight of the mixture enhances the attenuation of the foundry cores to microwave energy. Illustratively, a 1% addition of powdered graphite resulted in an observed attenuation value after compression and curing in the microwave oven of .975 to 1.690 db/cm. The curing times were drastically reduced to the order of seconds whereas conventional baking ovens required heating cycles of many minutes to a few hours depending on the size of the molds, the technique employed and whether conveyorized production equipment was utilized. It is believed that the dispersed high resistance material in the fine granular mass contributes to localized heating in such instances where a varied network of dielectric loss factors exist in the load due to different materials and particle sizes. Foundry cores also conventionally have a moisture content due to the desirability of the mold being self-supporting before being placed in the oven. The microwave energy in being absorbed throughout the mix by the particles of anechoic material rapidly heats the moisture ingredient and thereby quickly equalizes the baking temperature for the selected thermosetting binder resins being used to bring about complete polymerization. A more uniformly bonded and cohesive end product will therefore result in the shortest time possible by the application of microwave energy in this field.

Figure 2:
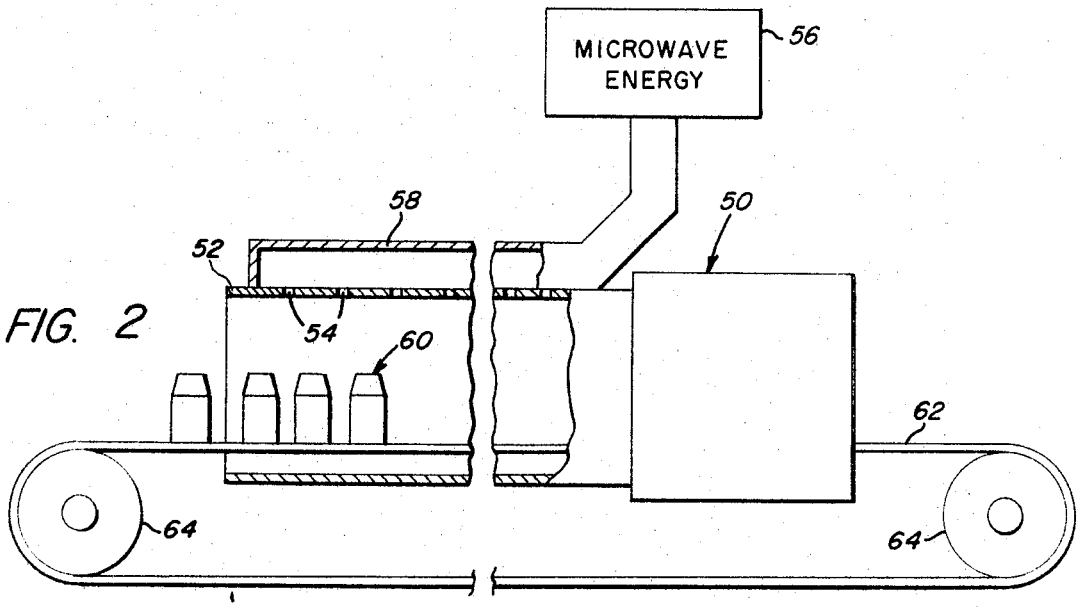
FIG. 2 is a longitudinal view partly in section of a conveyorized microwave heating apparatus with the product embodying the invention disposed therein.

Conveyorized apparatus is illustrated in FIG. 2 and includes an elongated metallic tunnel oven enclosure 50 having a top wall 52 provided with a plurality of openings 54. Microwave energy from a suitable source 56 is fed into waveguide 58 disposed adjacent to wall 52. Such energy is directed through openings 54 into the interior of the oven 50. The product to be processed, reference numeral 60, is carried through the oven by a continuous conveyor belt 62 traversing rotatable drums 64. Suitable drive means (not illustrated) are applied to one of the drums to achieve movement of the belt in the desired direction at a predetermined speed consonant with the required drying times for curing or processing the product. Again, as in the exemplary embodiment in FIG. 1, it is preferred that the product be supported by dielectric material means. By means of the conveyorized microwave heating apparatus larger volumes of the product may be processed.

Figure 3:
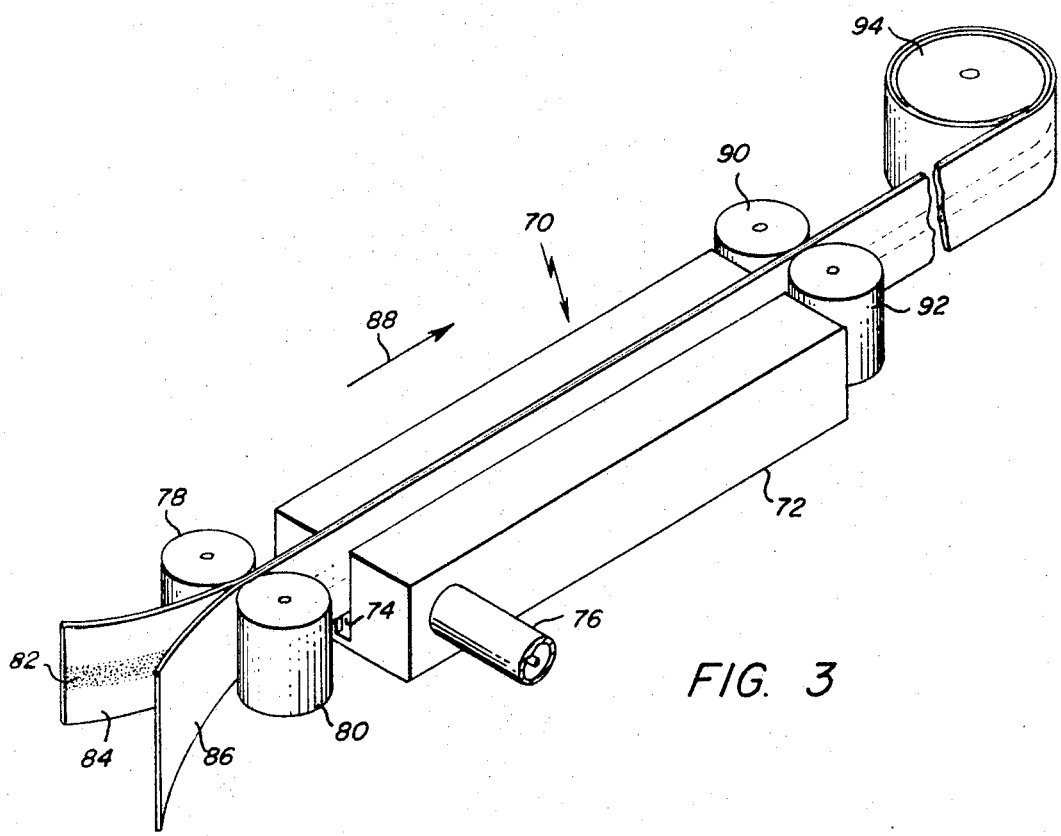
FIG. 3 is an elevation view of still another embodiment of the invention.

Referring now to FIG. 3, an alternative embodiment of the invention is illustrated which is applicable to the multiform collating field involving the hot-melting of adhesives. Microwave energy is also readily adaptable to this field for selectively heating the resins employed as adhesives. An oven 70 comprising an elongated waveguide section 72 having a slot 74 extending throughout its length is radiated by a suitable microwave energy source, as hereinbefore described, by means of a coaxial conductor 76. The product, illustratively, continuous lengths of a fibrous organic material, such as paper, is fed into one end of the microwave oven through alignment rollers 78 and 80. Each length of paper has a strip of an adhesive material 82 disposed on one side as shown on sheet 84. In this illustration a plain sheet 86 is shown juxtapositioned with sheet 84 which may be the top sheet of a large stack and be free of any adhesive binder since no succeeding layers will be bonded to it. Conventionally, a considerable number of continuous sheets may be fed into the oven apparatus, each similar to sheet 84, by suitable feed rollers (not shown). The direction of travel is indicated by arrow 88. After traversing the oven another set of rollers 90 and 92 are provided adjacent the take-up reel 94 holding the final bonded product.

To assure complete heating of the adhesives a small percentage of a high microwave energy absorbent material such as powdered graphite, carbon black or barium titanate, was incorporated in the adhesive mix. Heating times would be in the order of a few seconds and the significant factor is that no adverse effects such as charring or burning of the paper was encountered. The power requirement for the microwave heating apparatus would be in the vicinity of 1.7 kilowatts with a web speed of 400 feet per minute through the microwave oven.

It is evident that the selective heating of the adhesive by addition of microwave energy absorbing materials has opened many new vistas for the utilization of this high frequency energy in numerous other fields as well. Another example is the fabrication of counters or inner soles in the shoe industry where layers of fabric, felt and leather are adhesively bonded. Conventional thermal heating processes available in this field may damage the leather. Adhesives therefore have been separately heated and fed by elaborate systems to the end product. In both these examples then further advantages are found in the elimination of unreliable bonding due to application of hot glues to a cold product, and reduction in downtime due to adherence of previously heated glues to the rollers and spillage.

While the invention has been described relating to self-supporting cores, it is within the purview of the teachings to retain the cores in molds of a low loss dielectric material during the baking cycle. In addition, other high power microwave energy generators may be employed with comparable results.

Numerous other embodiments, modifications and alterations will be evident to those skilled in the art and the invention is therefore to be interpreted in accordance with the scope and spirit of the claims hereto appended.

What is claimed is:

1. In combination:
an enclosure;
means for radiating electromagnetic wave energy at microwave frequencies within said enclosure;
a body positioned within said enclosure of a granular refractory base material of mineral composition together with a binder of a thermosetting resinous material dispersed within said base material and an additive of a material having high microwave energy absorbing characteristics.

2. The combination in accordance with claim 1 wherein said body is shaped in a predetermined configuration which is maintained while said body is within said enclosure.

3. In combination:
an enclosure;
means for radiating electromagnetic wave energy at microwave frequencies within said enclosure;
a body positioned within said enclosure of a fine granular base material of sand together with a binder of a thermosetting resinous material and an additive of a material having a high electrical energy resistivity.

4. In combination:
an enclosure;
means for radiating electromagnetic wave energy at microwave frequencies within said enclosure;
a body positioned within said enclosure of a fine granular base material of sand together with a binder of a powdered thermosetting resinous material dispersed within said base material and an additive of a small percentage by weight of a material selected from the group consisting of carbon, graphite and carbon black.

References Cited

UNITED STATES PATENTS

| | | | |
|---|---|---|---|
| 2,485,742 | 10/1949 | King | 264—26 |
| 3,249,658 | 5/1966 | Hodges | 264—25 |
| 3,294,879 | 12/1966 | Jacobs | 264—26 |

DOUGLAS J. DRUMMOND, Primary Examiner

U.S. Cl. X.R.

219—10.55; 264—26

UNITED STATES PATENT OFFICE
CERTIFICATE OF CORRECTION

Patent No. 3,519,517            Dated July 7, 1970

Inventor(s) Edward C. Dench

It is certified that error appears in the above-identified patent and that said Letters Patent are hereby corrected as shown below:

Please amend patent as follows:

Column 3, lines 28 and 29, after "mag-", insert -- netron by a loop 28. The central conductor 26 extends --;

Column 3, line 47, delete "agency" and insert -- energy --.

SIGNED AND
SEALED

OCT 27 1970

(SEAL)
Attest:

Edward M. Fletcher, Jr.
Attesting Officer

WILLIAM E. SCHUYLER, JR.
Commissioner of Patents